(12) United States Patent
Nogawa

(10) Patent No.: US 9,534,921 B2
(45) Date of Patent: Jan. 3, 2017

(54) NAVI-SERVER, NAVI-CLIENT, AND NAVI-SYSTEM

(71) Applicant: HONDA MOTOR CO., LTD., Tokyo (JP)

(72) Inventor: Tadafumi Nogawa, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 14/386,399

(22) PCT Filed: Mar. 21, 2013

(86) PCT No.: PCT/JP2013/058036
§ 371 (c)(1),
(2) Date: Sep. 19, 2014

(87) PCT Pub. No.: WO2013/146518
PCT Pub. Date: Oct. 3, 2013

(65) Prior Publication Data
US 2015/0046087 A1 Feb. 12, 2015

(30) Foreign Application Priority Data

Mar. 27, 2012 (JP) .................................. 2012-071724

(51) Int. Cl.
*G01C 21/00* (2006.01)
*G01C 21/36* (2006.01)
(Continued)

(52) U.S. Cl.
CPC .......... *G01C 21/3691* (2013.01); *B60W 20/12* (2016.01); *B60W 40/04* (2013.01);
(Continued)

(58) Field of Classification Search
CPC ... G01C 21/3691; B60W 40/04; G08G 1/0141
(Continued)

(56) References Cited

U.S. PATENT DOCUMENTS 6,650,948 B1 * 11/2003 Atkinson ............. G08G 1/0104
340/995.13
6,754,583 B2 * 6/2004 Verbil ........................ 701/454
(Continued)

FOREIGN PATENT DOCUMENTS

JP 2004-101236 4/2004
JP 2005-202799 7/2005
(Continued)

OTHER PUBLICATIONS

International Search Report, Date of mailing: Apr. 23, 2013 (Apr. 23, 2013).
(Continued)

*Primary Examiner* — Harry Oh
(74) *Attorney, Agent, or Firm* — Rankin, Hill & Clark LLP

(57) ABSTRACT

Provided is a navi-system or the like capable of improving accuracy of road traffic information that is created based on probe information. A navi-client 2 creates probe information including an identifier that represents a detection result as to whether a communication with a vehicle-mounted device 3 has been established or not. A server communication device 1 discriminates or selects probe information in accordance with a difference of the identifier, and creates road traffic information based on the thus discriminated or selected probe information.

18 Claims, 3 Drawing Sheets

(51) Int. Cl.
*G08G 1/01* (2006.01)
*G08G 1/0968* (2006.01)
*B60W 40/04* (2006.01)

(52) U.S. Cl.
CPC ........... *G08G 1/012* (2013.01); *G08G 1/0112* (2013.01); *G08G 1/0133* (2013.01); *G08G 1/0141* (2013.01); *G08G 1/096811* (2013.01); *G08G 1/096844* (2013.01); *B60W 2550/402* (2013.01)

(58) Field of Classification Search
USPC .......................................................... 701/522
See application file for complete search history.

(56) References Cited

U.S. PATENT DOCUMENTS

| | | | |
|---|---|---|---|
| 8,489,314 B2* | 7/2013 | Nortrup | 701/117 |
| 2002/0121989 A1* | 9/2002 | Burns | 340/901 |
| 2002/0152269 A1* | 10/2002 | Ichimura | 709/203 |
| 2003/0060974 A1* | 3/2003 | Miyahara et al. | 701/209 |
| 2004/0098194 A1* | 5/2004 | Baur et al. | 701/209 |
| 2005/0043880 A1* | 2/2005 | Yamane et al. | 701/200 |
| 2005/0231394 A1* | 10/2005 | Machii et al. | 340/995.13 |
| 2006/0058940 A1* | 3/2006 | Kumagai et al. | 701/117 |
| 2006/0167616 A1* | 7/2006 | Yamane et al. | 701/117 |
| 2007/0038372 A1* | 2/2007 | Kudo et al. | 701/211 |
| 2007/0112780 A1* | 5/2007 | Stone et al. | 707/10 |
| 2007/0225908 A1* | 9/2007 | Kim et al. | 701/210 |
| 2008/0177460 A1* | 7/2008 | Blackwood | G01C 21/26 701/118 |
| 2008/0177461 A1* | 7/2008 | Blackwood | 701/200 |
| 2008/0215233 A1* | 9/2008 | Adachi | 701/118 |
| 2008/0255754 A1* | 10/2008 | Pinto | 701/119 |
| 2009/0082950 A1* | 3/2009 | Vorona | 701/119 |
| 2010/0082244 A1* | 4/2010 | Yamaguchi et al. | 701/208 |
| 2010/0094532 A1* | 4/2010 | Vorona | 701/119 |
| 2010/0100307 A1* | 4/2010 | Kim | 701/119 |
| 2010/0145570 A1* | 6/2010 | Asahara | G08G 1/207 701/31.4 |
| 2010/0191456 A1* | 7/2010 | Nogawa | 701/201 |
| 2010/0295803 A1* | 11/2010 | Kim | G06F 3/0488 345/173 |
| 2011/0098916 A1* | 4/2011 | Jang | 701/201 |
| 2011/0144905 A1* | 6/2011 | Tahara | G01C 21/26 701/533 |
| 2011/0288871 A1* | 11/2011 | Suzuki | B60R 16/0373 704/275 |
| 2011/0319099 A1* | 12/2011 | Beuk | 455/456.3 |
| 2012/0083995 A1* | 4/2012 | Vorona | 701/119 |
| 2012/0123676 A1* | 5/2012 | Seino | G01C 21/3469 701/454 |
| 2013/0144487 A1* | 6/2013 | Suzuki | G06F 17/00 701/36 |

FOREIGN PATENT DOCUMENTS

| | | |
|---|---|---|
| JP | 2009-008805 | 1/2009 |
| JP | 2009-110234 | 5/2009 |
| JP | 2011-086069 | 4/2011 |
| JP | 2011-119990 | 6/2011 |
| JP | 2012-018587 | 1/2012 |

OTHER PUBLICATIONS

Written Opinion of the International Searching Authority dated Apr. 23, 2013, English translation included.

* cited by examiner

NAVI-SERVER, NAVI-CLIENT, AND NAVI-SYSTEM

TECHNICAL FIELD

The present invention relates to a navi-client, for example, configured to transmit probe information serving as a basis for road traffic information to a navi-server.

BACKGROUND ART

A navi-server is proposed, which is configured to create road traffic information on the basis of probe information that is collected from a navi-client having a position measurement function, the probe information representing time-series measurement positions of the navi-client (see Patent Literature 1). Herein, "navi" is a short form of the word "navigation". A technique of acquiring image data from a mobile terminal device equipped with a navigation function and displaying the image data on a vehicle-mounted touch-panel type display is proposed (see Patent Literature 2).

CITATION LIST

Patent Literatures

Patent Literature 1: Japanese Patent No. 4177422
Patent Literature 2: Japanese Patent Application Laid-Open No. 2012-018587

SUMMARY OF INVENTION

Technical Problem

In the configuration including a mobile terminal device as a navi-client, it is not clear whether the navi-client as a source for probe information is mounted on a vehicle or is carried by a pedestrian. This means that an actual road traffic state often cannot be reflected correctly on the road traffic information created based on the probe information.

Then it is an object of the present invention to provide a navi-system or the like capable of improving accuracy of road traffic information that is created based on probe information.

Solution to Problem

The present invention relates to a navi-server including: a first server arithmetic processing element that is configured to receive, from a navi-client, probe information representing a time-series change manner of a position of the navi-client; a second server arithmetic processing element that is configured to create road traffic information based on the probe information; and a server storage device that stores the road traffic information.

The present invention relates to a navi-client having a position measurement function, and that includes a first client arithmetic processing element that is configured to transmit probe information representing a time-series change manner of a measurement position to a navi-server.

According to a first aspect of the present invention, the first server arithmetic processing element of the navi-server is configured to receive the probe information including an identifier representing a communication state between the navi-client and a device mounted on designated travelling means or attachment/detachment of the navi-client with respect to an instrument attached to the designated travelling means, and the second server arithmetic processing element thereof is configured to discriminate or select the probe information in accordance with a difference of the identifier, and create the road traffic information based on the discriminated or selected probe information.

According to the first aspect of the present invention, the navi-client includes a second client arithmetic processing element that is configured to detect a communication state between the navi-client and a device mounted on a designated travelling means or attachment/detachment of the navi-client with respect to an instrument attached to the designated travelling means, and then create the probe information including an identifier representing a result of the detection.

According to the first aspect of the present invention, a navi-system includes a combination of the navi-server according to the first aspect and the navi-client according to the first aspect.

According to the navi-system of the first aspect of the present invention as well as the navi-server and the navi-client as its elements (hereinafter called "navi-system or the like" as needed), probe information collected from the navi-client is discriminated or selected in accordance with a difference of the identifier included therein. Then, road traffic information is created based on the discriminated or selected probe information.

A discrimination is made based on the identifier as to whether the travelling means of the user of the navi-client as the probe information source is the designated travelling means or not. This can avoid a situation where road traffic information is created based on a mixed state of probe information (group), which has to be originally discriminated based on the types of travelling means, with which accuracy of the road traffic information can be improved as a result.

According to a second aspect of the present invention, in the navi-server of the first aspect, the first server arithmetic processing element is configured to receive the probe information including the identifier representing a type of the designated travelling means that is identified with a result of a communication between the navi-client and the device or a manner to attach the navi-client to the instrument.

According to the second aspect of the present invention, in the navi-client of the first aspect, the second client arithmetic processing element is configured to detect a type of the designated travelling means that is identified with a result of a communication with the device or a manner to attach the navi-client to the instrument, and create the probe information including the identifier representing a result of the detection.

According to the second aspect of the present invention, a navi-system includes a combination of the navi-server according to the second aspect and the navi-client according to the second aspect.

According to the navi-system or the like of the second aspect of the present invention, a type of the designated travelling means as the travelling means of the user of the navi-client as the probe information source can be discriminated based on the identifier. This can avoid a situation where road traffic information is created based on a mixed state of probe information, which has to be originally discriminated in more details based on the types, in addition to whether it corresponds to the designated travelling means or not, with which accuracy of the road traffic information can be improved as a result.

According to a third aspect of the present invention, in the navi-server of the first or the second aspect, the first server arithmetic processing element is configured to receive the probe information including the identifier representing a level of positioning accuracy by the navi-client.

According to the third aspect of the present invention, in the navi-client of the first or the second aspect, the second client arithmetic processing element is configured to detect a level of positioning accuracy by the first client arithmetic processing element, and create the probe information including the identifier representing a result of the detection.

According to the third aspect of the present invention, a navi-system includes a combination of the navi-server according to the third aspect and the navi-client according to the third aspect.

According to the navi-system or the like of the third aspect of the present invention, a level of the positioning accuracy by the navi-client as the probe information source can be discriminated. This can avoid a situation where road traffic information is created based on a mixed state of probe information, which has to be originally discriminated or excluded based on positioning accuracy of the navi-client, in addition to differences based on the types of the travelling means, with which accuracy of the road traffic information can be improved as a result.

According to a fourth aspect of the present invention, in the navi-server of any one of the first to the third aspects, the first server arithmetic processing element is configured to receive the probe information including the identifier representing a type of contents that the navi-client outputs via the device or a manner of outputting of the contents.

According to the fourth aspect of the present invention, the navi-client according to any one of the first to the third aspects further includes a client storage device to store contents therein, and the second client arithmetic processing element is configured to detect an output manner of the contents output via the device or a type of the contents output via the device, and create the probe information including the identifier representing a result of the detection.

According to the fourth aspect of the present invention, a navi-system includes a combination of the navi-server according to the fourth aspect and the navi-client according to the fourth aspect.

According to the navi-system or the like of the fourth aspect of the present invention, a determination can be made as to whether the main object of the user of the navi-client as the probe information source is the usage of travelling means or the usage of contents. This can avoid a situation where road traffic information is created based on a mixed state of probe information (group), which has to be originally discriminated based on the types of the travelling means and the major object of the user, with which accuracy of the road traffic information can be improved as a result.

According to a fifth aspect of the present invention, in the navi-server of any one of the first to the fourth aspects, the first server arithmetic processing element is configured to receive request information including the identifier from the navi-client, the second server arithmetic processing element is configured to extract, from the server storage device, the road traffic information that is created based on the probe information including the identifier agreeing with the identifier included in the request information, and the first server arithmetic processing element is configured to transmit the extracted road traffic information or sub-information thereof to the navi-client.

According to the fifth aspect of the present invention, in the navi-client of any one of the first to the fourth aspects, the first client arithmetic processing element is configured to transmit request information including the identifier to the navi-server, and receive road traffic information that is created by the navi-server based on the probe information including an identifier agreeing with the identifier or sub-information thereof from the navi-server.

According to the fifth aspect of the present invention, a navi-system includes a combination of the navi-server according to the fifth aspect and the navi-client according to the fifth aspect.

According to the navi-system or the like of the fifth aspect of the present invention, to the user of the navi-client, road traffic information or sub-information thereof can be transmitted, which is based on the probe information collected from a navi-client in the same usage situation as that of the user. As a result, each user can receive very useful road traffic information or sub-information thereof, on which a road traffic state that another user in a similar usage situation of the navi-client faced or faces is accurately reflected.

According to a sixth aspect of the present invention, in the navi-server of the fifth aspect, the first server arithmetic processing element is configured to receive the request information further including position information on a current position and a goal position of the navi-client from the navi-client, the second server arithmetic processing element is configured to search for a server route connecting the current position and the goal position using the road traffic information extracted from the server storage device, and the first server arithmetic processing element is configured to transmit server route information representing the server route as the sub-information to the navi-client.

According to the sixth aspect of the present invention, in the navi-client of the fifth aspect, the first client arithmetic processing element is configured to transmit the request information further including position information on a current position and a goal position to the navi-server, and receive route information as the sub-information from the navi-server, the route information representing a server route connecting the current position and the goal position that is searched by the navi-server using the road traffic information based on the request information.

According to the sixth aspect of the present invention, a navi-system includes a combination of the navi-server according to the sixth aspect and the navi-client according to the sixth aspect.

According to the navi-system or the like of the sixth aspect of the present invention, to the user of the navi-client, route information (sub-information) representing a server route that is obtained by searching using road traffic information can be transmitted, the road traffic information being based on the probe information collected from a navi-client in the same usage situation as that of the user. As a result, each user can receive very useful road traffic information, on which a road traffic state that another user in a similar usage situation of the navi-client faced or faces is accurately reflected.

DESCRIPTION OF EMBODIMENTS

Figure 1:
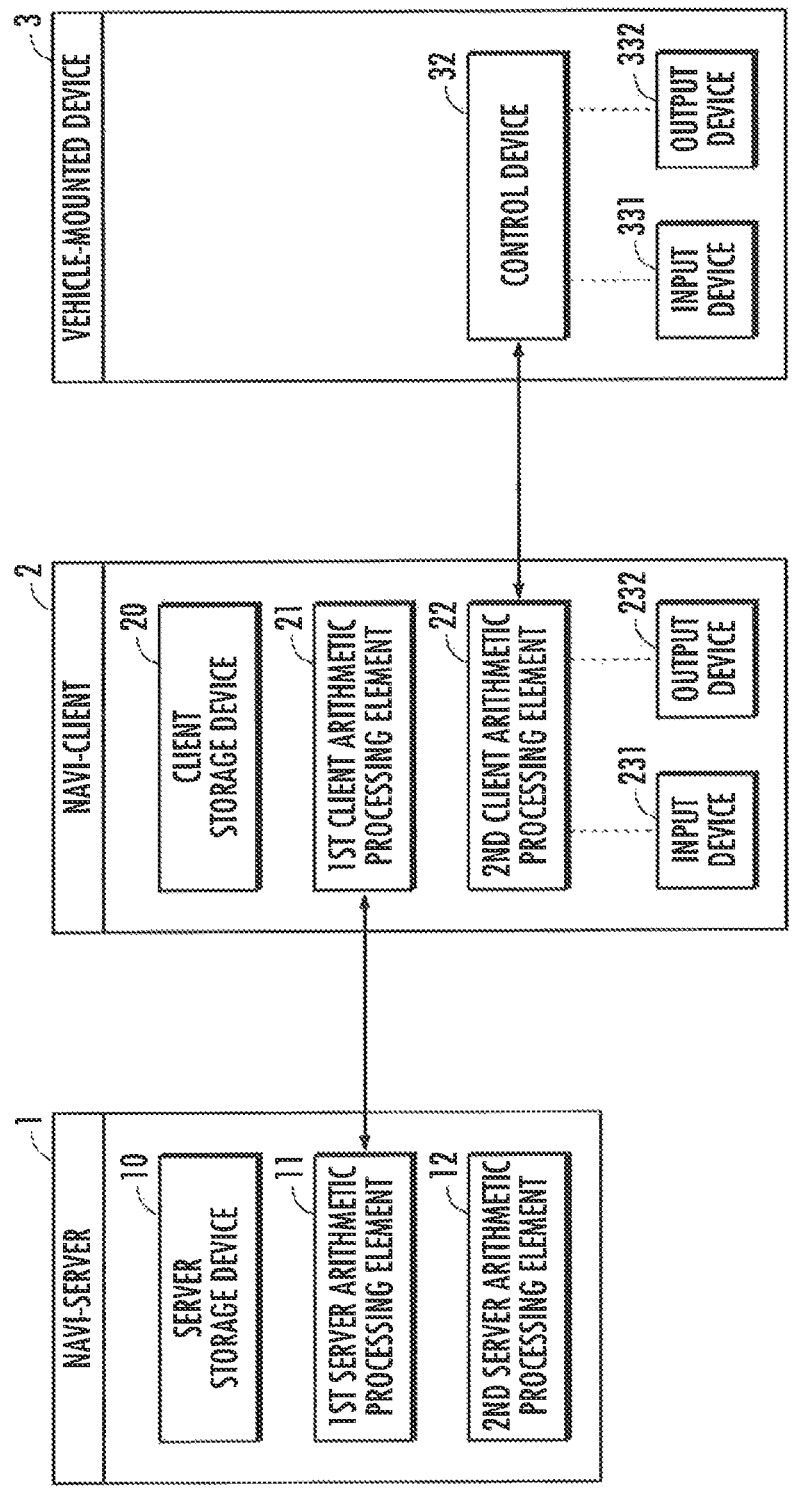
FIG. 1 shows a configuration of a navi-system of the present invention.

A navi-system illustrated in FIG. 1 includes a navi-server 1 and a navi-client 2 equipped with a linkage function with a vehicle-mounted device 3.

(Configuration of Navi-Server)

The navi-server 1 includes a server storage device 10, a first server arithmetic processing element 11 and a second server arithmetic processing element 12.

The server storage device 10 is configured to store road traffic information and server map information. The "road traffic information" contains first road traffic information including information such as required travelling time and the degree of traffic jam at each link that are calculated based on probe information (the position of each navi-client 2 at each time) that is transmitted or uploaded from the navi-client 2 to the navi-server 1. The "road traffic information" further contains, in addition to information such as required travelling time and the degree of traffic jam at each link that is transmitted from a server of a road traffic information center, for example, to the navi-server 1, second road traffic information including information representing the presence or not of traffic regulation at each link, information representing the fuel consumption amount or electricity consumption amount (fuel consumption or electricity consumption) at each link, information representing the presence or not of an event held around each link and the type of such event.

The "server map information" contains, in addition to the position, the shape, the attitude and the like of each link making up a road, which are represented with columns of coordinate values ((latitude, longitude) or (latitude, longitude, height)), link identification information to identify each link and data representing types of roads, for example.

The first server arithmetic processing element 11 and the second server arithmetic processing element 12 each include a arithmetic processing device (CPU) that reads software and data from a designation area of a memory making up the server storage device 10 as needed, and then executes designated arithmetic processing in accordance with the software with respect to the data.

The first server arithmetic processing element 11 is configured to receive, from the navi-client 2, "probe information" and "request information" which includes an "identifier". The first server arithmetic processing element 11 is configured to transmit "route information" representing a server route that is searched in accordance with the request information to the navi-client 2 as the origination of the request information. The route information contains coordinate information on a plurality of positions included in a client route R or link identification information to identify at least a part of the links.

The second server arithmetic processing element 12 is configured to discriminate or select probe information in accordance with a difference in the identifier included in each piece of the probe information, and to create road traffic information (first road traffic information) based on the discriminated or selected piece of probe information. The second server arithmetic processing element 12 is configured to search for an assistance route R to guide a user of the navi-client 2 from the current position $p_1$ to the goal position $p_2$. To search for the assistance route R, the road traffic information and the server map information stored in the server storage device 10 are used. In the road traffic information, when a piece of the first road traffic information is based on probe information containing an identifier different from the identifier contained in the request information, such a piece of the first road traffic information will be excluded.

(Configuration of Navi-Client)

The navi-client 2 includes a mobile terminal device, for example. The "mobile" refers to the size of a standard palm size of a human, for example and the weight that can be easily carried around with one hand or in a pocket of clothes. The navi-client 2 may be made up of a device that has a size and a weight larger than those of a mobile device.

The navi-client 2 includes a client storage device 20, a first client arithmetic processing element 21 and a second client arithmetic processing element 22.

The client storage device 20 is configured to store client map information, contents, and the like. The "client map information" contains coordinate columns representing the position, the shape, the attitude and the like of each link making up a road and link identification information to identify each link.

The client map information may not include the coordinate columns, but may include image information to display a map at an output device 232 and link identification information of each link making up a road included in the map. In this case, the navi-server 1 specifies coordinate values that agree with coordinate values included in the probe information or the request information in the coordinate values included in the server map information, whereby link identification information or the types of roads corresponding to the specified coordinate values may be specified.

Even when definitions or the like of coordinate columns may differ from one piece of map information to another because the client map information and the server map information have different specifications and data structures, common link identification information will be assigned to the same link, thereby enabling matching of a link. The navi-server 1 transmits route information containing link identification information, and the navi-client 2 displays an image of a navi-route covering a plurality of links that are identified with the link identification information contained in the route information via the output device 232.

The "contents" include contents that are recognized visually, such as image contents (still images and moving images) as well as acoustic contents (e.g., songs and operation sound) that are recognized in an auditory manner and entertainment contents including the combination of them. The image contents contain, in addition to a part of client map information, a client route that is to be displayed while being overlaid on the client map information.

The first client arithmetic processing element 21 is configured to measure the current position $p_1$ of the navi-client 2 successively. The current position $p_1$ of the navi-client 2 may be measured in accordance with a signal from an artificial satellite received with a GPS receiver or an output signal from a gyro sensor as needed.

The first client arithmetic processing element 21 is configured to transmit "probe information" representing a time-series changing manner of the position $p_1$ of the navi-client 2 to the navi-server 1. The first client arithmetic processing element 21 is configured to transmit "request information" to the navi-server 1 and then receive "route information" corresponding thereto from the navi-server 1.

The second client arithmetic processing element 22 is configured to detect a communication state (presence or not of a communication established) or the like between the navi-client 2 and the vehicle-mounted device 3 mounted on a four-wheeled vehicle (designated travelling means), and then to create "probe information" containing an identifier that the detection result represents. The second client arithmetic processing element 22 is configured to create, in addition to the current position $p_1$ and the goal position $p_2$ of the navi-client 2, "request information" including an identifier. The second client arithmetic processing element 22 is configured to search for a client route based on route information and using client map information.

The navi-client 2 further includes an input device 231 and the output device 232. The input device 231 includes an operation button or a microphone, enabling various operations or input setting via user's operations or utterance. The output device 232 includes a display device and an acoustic output device (speaker) to display image contents such as client map information or output acoustic contents. The input device 231 and the output device 232 may include a touch-panel type display.

(Configuration of Vehicle-Mounted Device)

The vehicle-mounted device 3 is generally configured to, when an IGN switch or an ACC switch of the vehicle (four-wheeled vehicle) turns ON and electricity is supplied thereto from a vehicle-mounted battery (not illustrated), exert a mutual linkage function with the navi-client 2. The designated travelling means does not have to be equipped with a device having a function for navigation, such as a position measurement function or a route searching function.

The vehicle-mounted device 3 is a display audio device, for example, that is mounted on a four-wheeled vehicle as the designated travelling means, and includes a control device 32 including a computer and a memory. The control device 32 is configured to be communicable with the navi-client 2 in a wireless manner or in wired manner via a connector (not illustrated). The control device 32 is configured to execute mutual authentication processing between the navi-client 2 and the vehicle-mounted device 3, and when the authentication result shows success, to establish a mutual communication between the navi-client 2 and the vehicle-mounted device 3.

The vehicle-mounted device 3 further includes an input device 331 and an output device 332. The input device 331 includes an operation button and a microphone, enabling various operations or input setting via user's operations or utterance. The output device 332 includes a display device having a screen larger than that of the display device of the navi-client 2 and an acoustic output device to display image contents provided from the navi-client 2 or output acoustic contents. The input device 331 and the output device 332 may include a touch-panel type display.

"Outputting" of information from elements of the present invention means outputting information in any form such as displaying, sound outputting and vibration outputting of the information so that a human can recognize the information using five senses such as seeing, hearing and touching. An element of the present invention being "configured" to execute their corresponding arithmetic processing means that the element has a function to read a necessary program and such data from a memory, for example, and execute their corresponding arithmetic processing in accordance with the program and based on the data, and accordingly means programming as such.

(Functions of Navi-System)

Figure 2:
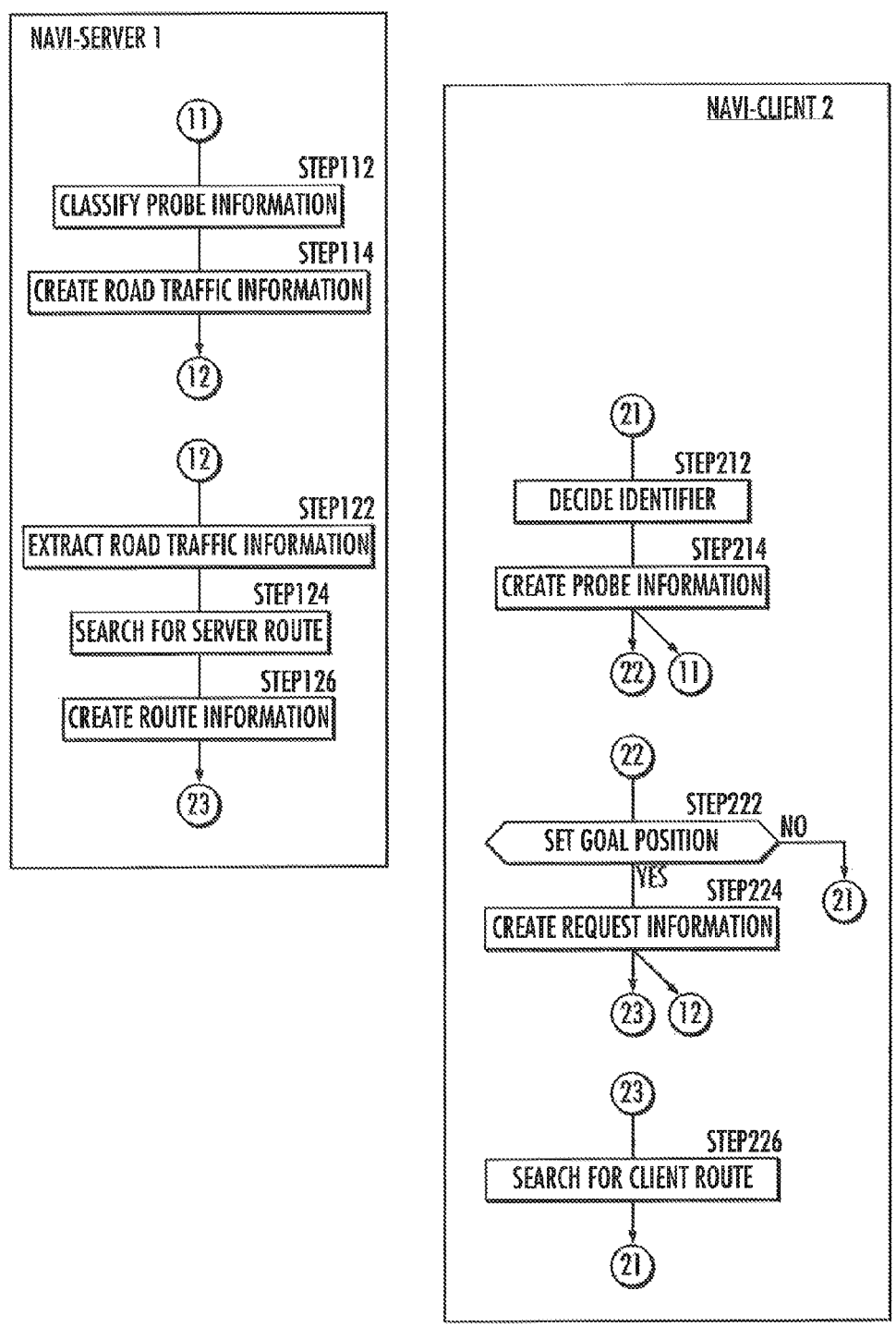
FIG. 2 describes a function of the navi-system of the present invention.

At the navi-client 2, the second client arithmetic processing element 22 sets an "identifier" (FIG. 2/STEP212).

Specifically, the second client arithmetic processing element 22 detects a communication state between the navi-client 2 and the vehicle-mounted device 3, and then sets a first identifier f1 based on the detection result. For instance, when the communication is not established, "0" is set as the first identifier f1. Whereas when the communication is established, "1" is set as the first identifier f1.

The second client arithmetic processing element 22 receives car-type information from the control device 32 of the vehicle-mounted device 3, and detects the type of the four-wheeled vehicle (designated travelling means) based on the car-type information, and then sets a second identifier f2 in accordance with the detection result. For instance, the second identifier f2 may be set at "1", "2", "3" or "4" based on whether it is a gasoline-powered vehicle (GAS), a hybrid vehicle (HEV), a plug-in hybrid vehicle (PHEV) or an electric vehicle (EV). Alternatively, the second identifier f2 may be set differently so that a discrimination can be made in more details in accordance with a difference of the specifications of an engine or a motor as a power supply of the vehicle.

The second client arithmetic processing element 22 detects the level (high or low) of the positioning accuracy by the first client arithmetic processing element 21, and sets a third identifier f3 based on the detection result. For instance, when the state of a received GPS signal is abnormal (when the intensity of received signal is lower than normal or the number of artificial satellites as suppliers of GPS signals is less than a normal value (e.g., "3")), the third identifier f3 is set at "0". Whereas, when the state of a received GPS signal is normal, the third identifier f3 may be set at "1".

If the position of the navi-client 2 measured with GPS is displaced from a road on the client map, map matching may be executed so as to correct the current position to a road in the vicinity thereof. The third identifier f3 may be set differently with the frequency of the map-matching executed during a certain past time.

The second client arithmetic processing element 22 detects the output manner of contents through the device 3 or a type of the contents output through the device 3, and then sets a fourth identifier f4 based on the detection result. For instance, when the output contents are image contents including a client map for navigation and a client route r, the fourth identifier f4 is set at "1". When the output contents are moving-image contents involving audio, the fourth identifier f4 is set at "2".

Among these four identifiers f1 to f4, setting for a part or all of the identifiers f2 to f4 may be omitted. For instance, since setting of the second identifier f2 and the fourth identifier f4 assumes a communication established (f1=1) between the navi-client 2 and the vehicle-mounted device 3, setting for any one or both of them may be omitted.

The second client arithmetic processing element 22 creates probe information that represents a time-series change manner of the measurement position of the navi-client 2 and includes the latest identifier set as stated above (FIG. 2/STEP214). In a data format of the probe information illustrated in FIG. 3, bit values in accordance with differences of the identifiers f1 to f4 are assigned to predetermined bit strings b1 to b4, respectively, at a header part, for example. Alternatively, a bit value corresponding to an identifier to identify a travelling trace for each time (for each duration from turning IGN switch ON to turning it OFF) may be assigned to another bit string.

When the first client arithmetic processing element 21 transmits the probe information to the navi-server 1, the first server arithmetic processing element 11 of the navi-server 1 receives the probe information and stores it in the server storage device 10. The second server arithmetic processing element 12 extracts the identifiers included in each piece of probe information stored in the server storage device 10, and classifies the probe information in accordance with differences of the identifiers (FIG. 2/STEP112).

The second server arithmetic processing element 12 creates road traffic information (first road traffic information) based on the probe information for each classification or updates the same sequentially (FIG. 2/STEP114). The road traffic information is classified for each identifier, and is stored in the server storage device 10.

At the navi-client 2, the second client arithmetic processing element 22 determines whether the user sets the goal position $p_2$ or not via the input device 231 (FIG. 2/STEP222). When the determination result is positive (FIG. 2/STEP222 ... YES), the second client arithmetic processing element 22 creates "request information" including an identifier in addition to the current position $p_1$ at the setting time or immediately before that and the goal position $p_2$ (FIG. 2/STEP224).

When the first client arithmetic processing element 21 transmits the request information to the navi-server 1, the first server arithmetic processing element 11 of the navi-server 1 receives the request information. The second server arithmetic processing element 12 extracts road traffic information that is discriminated with the identifier agreeing with the identifier included in the request information from the server storage device 10 (FIG. 2/STEP122). For instance, when the request information includes the combination of identifiers such as (f1, f2, f3, f4)=(1, 2, 1, 1), road traffic information that is created based on the probe information discriminated with the combination of these identifiers will be selectively extracted.

The second server arithmetic processing element 12 searches for a server route R connecting the current position $p_1$ and the goal position $p_2$ included in the request information using server map information and second road traffic information as needed, in addition to the extracted first road traffic information (FIG. 2/STEP124).

The second server arithmetic processing element 12 creates route information representing the server route R (FIG. 2/STEP126).

When the first server arithmetic processing element 11 transmits the route information to the navi-client 2 as the origination of the request information, the first client arithmetic processing element 21 of the navi-client 2 receives the route information and stores it in the client storage device 20.

The second server arithmetic processing element 12 searches for a client route r connecting the current position $p_1$ (the latest current position that is later than the setting time of the goal position $p_2$) and the goal position $p_2$ based on the route information and using the client map information (FIG. 2/STEP226).

The client route r is overlaid on the client map with a mark representing the current position $p_1$ of the navi-client 2, which is displayed on the display making up the output device 232 of the navi-client 2. When a communication between the navi-client 2 and a display audio device as the vehicle-mounted device 3 is established (the first identifier f1 is "1"), the client route r, the mark and the client map may be output via the output device 332 of the vehicle-mounted device 3 as image contents.

(Advantageous Effects of Navi-System)

Figure 3:
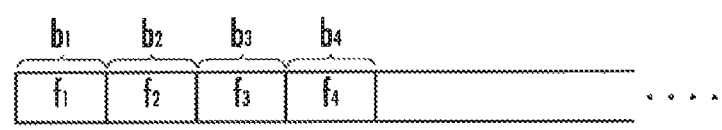
FIG. 3 describes a format of probe information.

According to the navi-system or the like of the present invention, probe information collected from the navi-client 2 is discriminated or selected in accordance with differences of identifiers included therein (FIG. 2/STEP112, see FIG. 3). Then, road traffic information is created based on the thus discriminated or selected probe information (see FIG. 2/STEP114).

A discrimination is made based on the first identifier f1 as to whether the travelling means of the user of the navi-client 2 as the probe information source is a four-wheeled vehicle (designated travelling means) or not. That is, when the first identifier f1 is "1", a communication between the navi-client 2 and the vehicle-mounted device 3 is established, meaning a high probability that the travelling means of the user of the navi-client 2 is a four-wheeled vehicle (designated travelling means) with the vehicle-mounted device 3 mounted thereon. On the other hand, when the first identifier f1 is "0", there is a high probability that the travelling means of the user of the navi-client 2 is other than a four-wheeled vehicle, such as walking or a bicycle.

This can avoid a situation where road traffic information is created based on a mixed state of probe information (e.g., probe information representing various travelling manners including a four-wheeled vehicle, a two-wheeled vehicle, a bicycle and a pedestrian), which has to be originally discriminated based on the types of travelling means, with which accuracy of the road traffic information can be improved as a result.

When a user stops the vehicle and leaves the vehicle temporarily while carrying the navi-client 2 for some reason, then a communication between the navi-client 2 and the vehicle-mounted device 3 will be disconnected. In such a case, the probe information during the time includes "0" as the first identifier f1. This can avoid a situation where the probe information during the time when the user temporarily leaves from the vehicle is used to calculate a required travelling time (cost) of the four-wheeled vehicle at a nearby road without discriminating it from the probe information including "1" as the first identifier f1.

Based on the second identifier f2, a discrimination is made as to the type (e.g., GAS, HEV, PHEV and EV) of the four-wheeled vehicle (designated travelling means) that is the travelling means of the user of the navi-client 2 as the probe information source. This can avoid a situation where road traffic information is created based on a mixed state of probe information, which has to be originally discriminated in more details based on the types, in addition to whether it corresponds to the designated travelling means or not, with which accuracy of the road traffic information can be improved as a result.

For instance, this can avoid a situation where, when a PHEV (plug-in hybrid vehicle) or an EV (electric vehicle) as the designated travelling means has to keep a vehicle-stop state or a low-speed travelling state inevitably due to electricity failure or the like, road traffic information generally indicating high cost (required travelling time) for a road (link) where the EV exists is created.

Based on the third identifier f3, a discrimination is made as to the level (high or low) of the positioning accuracy by the navi-client 2 as the probe information source. This can discriminate probe information that is collected from a navi-client 2 having low GPS positioning accuracy, e.g., when the user of the navi-client 2 travels through a tunnel or travels on a road surrounded with tall buildings from probe information that is collected from a navi-client 2 having high GPS positioning accuracy.

This can avoid a situation where road traffic information is created based on probe information that may cause misunderstanding that the user, who actually moves, continues a stop state and then travels at an excessive high speed and so the accuracy of the road traffic information deteriorates due to such probe information. That is, this can avoid a situation where road traffic information is created based on a mixed state of probe information, which has to be originally discriminated or excluded based on positioning accuracy of the navi-client 2, in addition to differences based on the types of the travelling means, with which accuracy of the road traffic information can be improved as a result.

Based on the fourth identifier f4, a determination is made as to whether the main object of the user of the navi-client 2 as the probe information source is the usage of travelling means or the usage of contents. This can avoid a situation where road traffic information is created based on a mixed state of probe information, which has to be originally discriminated based on the types of the travelling means and the major object of the user, with which accuracy of the road traffic information can be improved as a result.

To the user of the navi-client 2, route information (sub-information) is transmitted, representing server route R that is obtained by searching using the road traffic information based on the probe information collected from a navi-client 2 in the same usage situation as that of the user (see FIG. 2/STEPs122 to 126). As a result, each user can receive route information, on which a road traffic state that another user in a similar usage situation of the navi-client 2 faced or faces is accurately reflected, i.e., very useful route information.

(Other Embodiments of the Present Invention)

The second client arithmetic processing element 22 may be configured to detect whether the navi-client 2 is attached or detached with respect to an instrument attached to the designated travelling means, and set the first identifier f1 based on the detection result. For instance, when designated travelling means such as a two-wheeled vehicle or a bicycle includes an instrument exclusively used for attachment of the navi-client 2, the navi-client 2 may be provided with a switch that can be switched between ON/OFF in accordance with the attachment or detachment of the navi-client 2 with respect to the instrument. The switch may be of a pressure-sensitive type, and when the navi-client 2 is attached to the instrument, the switch turns ON by engaging with a predetermined part of the instrument or being pressed with a predetermined part, and when the navi-client 2 is detached from the instrument, the switch turns OFF by releasing the engagement with the predetermined part of the instrument or the pressing with the predetermined part.

In this case, when the switch is OFF, the second client arithmetic processing element 22 may set the first identifier f1 at "0", whereas when the switch is ON, it may set the first identifier f1 at "1".

Searching processing of a server route (see FIG. 2/STEP124) and creation processing of route information (see FIG. 2/STEP126) by the navi-server 1 may be omitted. Then, when road traffic information is transmitted to the navi-client 2, the second client arithmetic processing element 22 may be configured to search for a client route r connecting the current position $p_1$ and the goal position $p_2$ based on the road traffic information in addition to the client map information.

Identifiers included in the request information may be set based on the intention of a user. For instance, while a user is walking to a parking lot to drive a vehicle, the first identifier f1 may be switched from "0" to "1" via the operation of the input device 231 of the navi-client 2. This allows the user to acquire not road traffic information representing required travelling time of a pedestrian at each link but road traffic information representing required travelling time of the same type of vehicle at each link or sub-information such as route information of a server route R that is obtained by searching based on the road traffic information using the navi-client 2.

DESCRIPTION OF REFERENCE NUMERALS 1 navi-server
11 first server arithmetic processing element
12 second server arithmetic processing element
2 navi-client
21 first client arithmetic processing element
22 second client arithmetic processing element
3 vehicle-mounted device

The invention claimed is:

1. A navi-server, comprising:
a first server arithmetic processing element that is configured to receive, from a navi-client, probe information representing a time-series change manner of a position of the navi-client;
a second server arithmetic processing element that is configured to create road traffic information based on the probe information; and
a server storage device that stores the road traffic information, wherein
the first server arithmetic processing element is configured to receive the probe information including an identifier set to indicate a communication state between the navi-client and a device mounted on a designated travelling means or a state of attachment/detachment of the navi-client to an instrument attached to the designated travelling means, and
the second server arithmetic processing element is configured to discriminate or select the probe information in accordance with a difference of the identifier, and generate the road traffic information based on the discriminated or selected probe information.

2. The navi-server according to claim 1, wherein
the first server arithmetic processing element is configured to receive the probe information further including an identifier representing a type of the designated travelling means that is identified with the communication state between the navi-client and the device or the state of attachment/detachment of the navi-client to the instrument.

3. The navi-server according to claim 1, wherein
the first server arithmetic processing element is configured to receive the probe information further including an identifier representing a level of positioning accuracy determined by the navi-client.

4. The navi-server according to claim 1, wherein
the first server arithmetic processing element is configured to receive the probe information further including an identifier representing a type of contents that the navi-client outputs via the device or a manner of outputting the contents.

5. The navi-server according to claim 1, wherein
the first server arithmetic processing element is configured to receive request information including the identifier from the navi-client,
the second server arithmetic processing element is configured to extract, from the server storage device, the road traffic information that is created based on the probe information including the identifier agreeing with the identifier included in the request information, and
the first server arithmetic processing element is configured to transmit the extracted road traffic information or sub-information thereof to the navi-client.

6. The navi-server according to claim 5, wherein
the first server arithmetic processing element is configured to receive the request information further including position information on a current position and a goal position of the navi-client from the navi-client,
the second server arithmetic processing element is configured to search for a server route connecting the current position and the goal position using the road traffic information extracted from the server storage device, and the first server arithmetic processing element is configured to transmit server route information representing the server route as the sub-information to the navi-client.

7. A navi-client having a position measurement function that includes a first client arithmetic processing element that is configured to transmit probe information representing a time-series change manner of a measurement position to a navi-server, and a second client arithmetic processing element that is configured to detect a communication state between the navi-client and a device mounted on a designated travelling means or a state of attachment/detachment of the navi-client to an instrument attached to the designated travelling means, and then create the probe information including an identifier indicating the detected communication state between the navi-client and the device or the state of attachment/detachment of the navi-client to the instrument, wherein the navi-server discriminates or selects the probe information in accordance with a difference of the identifier, and generates road traffic information based on the discriminated or selected probe information.

8. The navi-client according to claim 7, wherein the second client arithmetic processing element is configured to detect a type of the designated travelling means that is identified with the communication state between the navi-client and the device or the state of attachment/detachment of the navi-client to the instrument, and then generate the probe information further including an identifier representing the detected type of the designated travelling means.

9. The navi-client according to claim 7, wherein the second client arithmetic processing element is configured to detect a level of positioning accuracy determined by the first client arithmetic processing element, and create the probe information further including an identifier representing the detected level of positioning accuracy.

10. The navi-client according to claim 7, further comprising a client storage device to store contents therein, wherein the second client arithmetic processing element is configured to detect an output manner of the contents output via the device or a type of a content output via the device, and then generate the probe information further including an identifier representing the detected output manner of the contents output via the device or the type of the content output via the device.

11. The navi-client according to claim 7, wherein the first client arithmetic processing element is configured to transmit request information including the identifier to the navi-server, and receive road traffic information that is created by the navi-server based on the probe information including an identifier agreeing with the identifier or sub-information thereof from the navi-server.

12. The navi-client according to claim 11, wherein the first client arithmetic processing element is configured to transmit the request information further including position information on a current position and a goal position to the navi-server, and receive route information as the sub-information from the navi-server, the route information representing a server route connecting the current position and the goal position that is searched by the navi-server using the road traffic information based on the request information.

13. A navi-system comprising a combination of a navi-server and a navi-client, wherein the navi-server includes:

a first server arithmetic processing element that is configured to receive, from the navi-client, probe information representing a time-series change manner of a position of the navi-client;

a second server arithmetic processing element that is configured to create road traffic information based on the probe information; and a server storage device that stores the road traffic information, wherein the first server arithmetic processing element is configured to receive the probe information including an identifier set to indicate a communication state between the navi-client and a device mounted on a designated travelling means or a state of attachment/detachment of the navi-client to an instrument attached to the designated travelling means, the second server arithmetic processing element is configured to discriminate or select the probe information in accordance with a difference of the identifier, and create the road traffic information based on the discriminated or selected probe information, and the navi-client has a position measurement function, and includes a first client arithmetic processing element that is configured to transmit probe information representing a time-series change manner of a measurement position to the navi-server, and a second client arithmetic processing element that is configured to detect the communication state between the navi-client and the device mounted on the designated travelling means or the state of attachment/detachment of the navi-client to the instrument attached to the designated travelling means, and then create the probe information including the identifier indicating the communication state between the navi-client and the device or the state of attachment/detachment of the navi-client to the instrument.

14. The navi-system according to claim 13, wherein the first server arithmetic processing element is configured to receive the probe information further including an identifier representing a type of the designated travelling means that is identified with the communication state between the navi-client and the device or the state of attachment/detachment of the navi-client to the instrument, and the second client arithmetic processing element is configured to detect the type of the designated travelling means that is identified with the communication state between the navi-client and the device or the state of attachment/detachment of the navi-client to the instrument, and then generate the probe information further including the identifier representing the detected type of designated travelling means.

15. The navi-system according to claim 13, wherein the first server arithmetic processing element is configured to receive the probe information further including an identifier representing a level of positioning accuracy determined by the navi-client, and the second client arithmetic processing element is configured to detect the level of positioning accuracy determined by the first client arithmetic processing element, and then generate the probe information including the identifier representing the detected level of positioning accuracy.

16. The navi-system according to claim 13, wherein
the first server arithmetic processing element is configured to receive the probe information further including an identifier representing a type of contents that the navi-client outputs via the device or a manner of outputting the contents,
the navi-client further includes a client storage device to store contents therein, and
the second client arithmetic processing element is configured to detect an output manner of the contents via the device or a type of the contents output via the device, and then generate the probe information including the identifier representing the detected output manner of the contents output via the device or the type of the content output via the device.

17. The navi-system according to claim 13, wherein
the first server arithmetic processing element is configured to receive request information including the identifier from the navi-client,
the second server arithmetic processing element is configured to extract the road traffic information that is created based on the probe information including the identifier agreeing with the identifier included in the request information from the server storage device,
the first server arithmetic processing element is configured to transmit the extracted road traffic information or sub-information thereof to the navi-client, and
the first client arithmetic processing element is configured to transmit the request information including the identifier to the navi-server, and receive road traffic information that is created by the navi-server based on the probe information including an identifier agreeing with the identifier or sub-information thereof from the navi-server.

18. The navi-system according to claim 17, wherein
the first server arithmetic processing element is configured to receive the request information further including position information on a current position and a goal position of the navi-client from the navi-client,
the second server arithmetic processing element is configured to search for a server route connecting the current position and the goal position using the road traffic information extracted from the server storage device,
the first server arithmetic processing element is configured to transmit server route information representing the server route as the sub-information to the navi-client, and
the first client arithmetic processing element is configured to transmit the request information further including position information on a current position and a goal position to the navi-server, and receive route information as the sub-information from the navi-server, the route information representing a server route connecting the current position and the goal position that is searched by the navi-server using the road traffic information based on the request information.

* * * * *